US006816728B2

(12) United States Patent
Igloi et al.

(10) Patent No.: US 6,816,728 B2
(45) Date of Patent: Nov. 9, 2004

(54) AIRCRAFT DATA COMMUNICATION SYSTEM AND METHOD

(75) Inventors: Tamas M. Igloi, Torrance, CA (US); Ghobad Karimi, Tarzana, CA (US)

(73) Assignee: Teledyne Technologies Incorporated, Los Angeles, CA (US)

(*) Notice: Subject to any disclaimer, the term of this patent is extended or adjusted under 35 U.S.C. 154(b) by 228 days.

(21) Appl. No.: 10/128,873

(22) Filed: Apr. 24, 2002

(65) Prior Publication Data

US 2003/0203734 A1 Oct. 30, 2003

(51) Int. Cl.⁷ .................................................. H04Q 7/20
(52) U.S. Cl. ..................... 455/431; 455/431.1; 455/11.1
(58) Field of Search .................... 455/431, 11.1, 455/403, 404.2, 412.1, 412.2, 414.1, 414.2, 418, 419, 420, 424, 456.1

(56) References Cited

U.S. PATENT DOCUMENTS

| | | | |
|---|---|---|---|
| 5,707,237 A | * | 1/1998 | Takemoto et al. ............ 434/69 |
| 5,794,145 A | | 8/1998 | Milam |
| 6,047,165 A | | 4/2000 | Wright et al. |
| 6,104,914 A | | 8/2000 | Wright et al. |
| 6,108,523 A | | 8/2000 | Wright et al. |
| 6,148,179 A | | 11/2000 | Wright et al. |
| 6,154,636 A | | 11/2000 | Wright et al. |
| 6,154,637 A | | 11/2000 | Wright et al. |
| 6,160,998 A | | 12/2000 | Wright et al. |
| 6,163,681 A | | 12/2000 | Wright et al. |
| 6,167,238 A | | 12/2000 | Wright |
| 6,167,239 A | | 12/2000 | Wright et al. |
| 6,173,159 B1 | | 1/2001 | Wright et al. |
| 6,181,990 B1 | | 1/2001 | Grabowsky et al. |
| 6,308,044 B1 | | 10/2001 | Wright et al. |
| 6,308,045 B1 | | 10/2001 | Wright et al. |
| 6,311,060 B1 | * | 10/2001 | Evans et al. ............. 455/426.1 |
| 6,363,248 B1 | | 3/2002 | Silverman |
| 2001/0019966 A1 | | 9/2001 | Idaka |
| 2002/0045973 A1 | | 4/2002 | Odashima et al. |

* cited by examiner

*Primary Examiner*—Cong van Tran
(74) *Attorney, Agent, or Firm*—Kirkpatrick & Lockhart LLP

(57) ABSTRACT

An aircraft avionics software and database upload transmission/reception system using a cellular data transmission/reception system. An aircraft data communications system and method including a communications device located in an aircraft; an avionics information storage device located in the aircraft in communication with the communications device; a cellular infrastructure in communication with the communications device; and a computer remotely located from the aircraft in communication with the cellular infrastructure. The communications device and the computer establish a bi-directional communications channel via the cellular infrastructure between the communications device and the computer and initiate a data exchange therebetween.

104 Claims, 8 Drawing Sheets

AIRCRAFT DATA COMMUNICATION SYSTEM AND METHOD

BACKGROUND

The present invention is directed generally to an aircraft avionics software and database upload transmission/reception system and, more particularly, to an aircraft cellular data transmission/reception system.

It is common for aircraft avionics systems to require upload of software and database changes. Presently, most aircraft utilized in passenger, freighter, and business categories require some degree of software and database uploads. An upload may include installing new software releases and operational databases into on-board avionics subsystems. These uploads are currently predominantly accomplished manually by connecting an upload device (a portable data loader) to an aircraft, or using a permanently installed data loader and inserting the appropriate upload media, such as one or more floppy disks, into the data loader. Upon completion of the transfer from the media to the intended avionics unit, the software part number and revision number of the uploaded software is verified manually.

Navigation databases are typically uploaded in 28-day intervals. Uploading new software versions is performed whenever a new version is issued by the respective avionics equipment manufacturer. On average this may occur once or twice a year per avionics unit. For example, up to 12 subsystems are uploadable on a B737 NG and up to 35 subsystems are uploadable on a B777. The administration, uploading, and logging of the avionics software updates for a fleet of aircraft may require considerable effort by aircraft operators. Therefore, cost savings through automation is desired by the aircraft operators.

Conventional manual uploading techniques involve humans, to various degrees, as active components in carrying out the uploading. The steps include managing, coordinating distribution of the software media, distributing the software media to maintenance facilities, delivering the software media to each aircraft, loading the software from the media via the data loader to a target avionics unit, verifying the part and revision numbers of newly loaded software, and returning the software media to a storage off the aircraft or storing the media on the aircraft.

It is known to use a computer system to manage the software updating process for the aircraft. It is also known to use radio frequency (RF) transmissions to transmit software and database uploads relating to an aircraft. It is also known to transmit data relating to an aircraft via a telephone system located in an airport terminal.

SUMMARY

In one embodiment, the present invention relates to an aircraft data communications system, comprising: a communications device located in an aircraft; an avionics information storage device located in the aircraft and in communication with the communications device and a cellular infrastructure; a computer remotely located from the aircraft and in communication with the cellular infrastructure; wherein, at least one of the communications device and the computer is used for establishing a bi-directional communications channel via the cellular infrastructure between the communications device and the computer and initiating a data exchange therebetween.

In another embodiment, the present invention provides an aircraft data management system, comprising: a communications device located in an aircraft and in communication with a cellular infrastructure for establishing a bi-directional communications channel via the cellular infrastructure between the communications device and a remotely located computer; and an avionics information storage device located in the aircraft and in communication with the communications device, the avionics information storage device including a line replaceable unit; wherein the communications device is used for receiving avionics information from the remotely located computer and transmitting data associated with the aircraft to the remotely located computer.

In yet another embodiment, the present invention provides an aircraft data management system, comprising: a communications device located remotely from an aircraft and in communication with a cellular infrastructure for establishing a bi-directional communications channel via the cellular infrastructure between the communications device and the remote aircraft; and a computer in communication with the communications device; wherein the communications device is used for transmitting avionics information from the computer to the remote aircraft and receiving data associated with the aircraft from the remote aircraft.

In still another embodiment, the present invention provides an aircraft, comprising: a communications device; and an avionics information storage device in communication with the communications device; wherein, the communications device is used for establishing a bi-directional communications channel via the cellular infrastructure between the communications device and a computer remotely located from the aircraft and initiating a data exchange therebetween; and wherein the communications device is used for receiving avionics information from the remotely located computer and transmitting data associated with the aircraft to the remotely located computer.

In a further embodiment, the present invention provides a network, comprising: a cellular infrastructure for bi-directionally communicating information associated with an aircraft between a communications device located on the aircraft and a computer located remotely from the aircraft; wherein the communications device and the computer are configured for communicating via the cellular infrastructure.

In another embodiment, the present invention provides a method of updating digital files in an aircraft, comprising: transmitting a request for a file from an aircraft to a remotely located computer via a cellular infrastructure; receiving the file transmitted by the remotely located computer via the cellular infrastructure in the form of a plurality of packets; and processing the plurality of packets to restore the file transmitted by the remotely located computer.

In yet another embodiment, the present invention provides a method of updating digital files in an aircraft, comprising: receiving a request for a file from an aircraft at a remotely located computer via a cellular infrastructure; processing the requested file into a plurality of packets; and transmitting the plurality of packets by the remotely located computer to the requesting aircraft via the cellular infrastructure.

In still another embodiment, the present invention provides a method of receiving a file in an aircraft, comprising: receiving an event signal by an aircraft; initiating a connection request with a computer remotely located from the aircraft for uploading a file; starting an initial primary data thread for making an initial call for a connection request to the remotely located computer; initiating a PPP connection for the primary data thread via at least one of a plurality of cellular channels; determining if a cellular channel was successfully opened; if a cellular channel was successfully opened: sending a connection request packet to the remotely located computer; determining whether the remotely located computer contains the requested file; if the remotely located computer contains the requested file: opening secondary data threads; receiving the file from the remotely located computer in the form of packets; determining whether any packets have not been received; loading the file to an avionics information storage device; and if the cellular channel was not successfully opened: initiating a PPP connection for a subsequent data thread.

In a further embodiment, the invention provides a method of transmitting a file to an aircraft, comprising: creating a socket upon receiving a request for a file; receiving a connection message from a network; determining whether there is a file available for uploading to an aircraft based on the request; if a file is available for uploading: sending an upload request message to the aircraft; sending an acknowledgement for the request to the aircraft; retrieving the file to be uploaded to the aircraft from a storage device; processing the file; transmitting the packets via the cellular infrastructure over the network to the aircraft; when no packets remain to be sent, receiving an acknowledgement message from the aircraft; and closing the socket.

These and various other features of the embodiments of the present invention will become apparent to those skilled in the art from the following description and corresponding drawings. As will be realized, the present invention is capable of modification without departing from the scope of the invention. Accordingly, the description and the drawings are to be regarded as being illustrative in nature, and not as being restrictive.

BRIEF DESCRIPTION OF THE DRAWINGS

The present invention will be described in conjunction with the following figures, wherein like parts are referenced by like numerals throughout the several views and wherein.

DESCRIPTION

Figure 1:
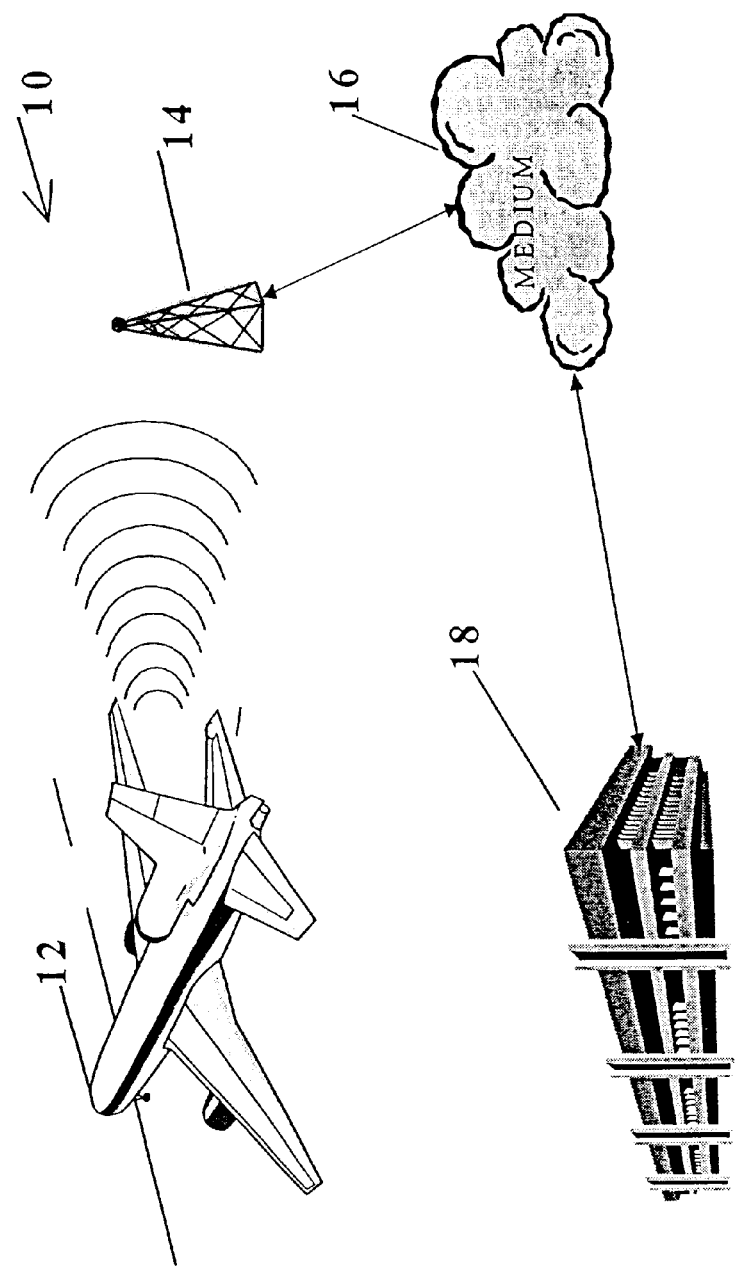
FIG. 1 illustrates an aircraft software and database upload distribution and transmission system according to an embodiment of the present invention.

It is to be understood that the figures and descriptions of the present invention have been simplified to illustrate elements that are relevant for a clear understanding of the present invention while eliminating, for purposes of clarity, other elements found in a conventional communications system. It can be recognized that other elements may be desirable and/or required to implement a device incorporating the present invention. For example, the details of the avionics software upload method (ARINC 615, ARINC 615A), cellular communications infrastructure, the Internet, and the public-switched telephone network are not disclosed because such elements are well known in the art. Furthermore, because the description of such elements does not facilitate a better understanding of the present invention, a discussion of such elements is not provided herein.

Accordingly, one embodiment of the present invention provides an aircraft software and database upload system for automatically transferring software and database uploads between an airline/operators engineering center and an aircraft with little or no human involvement and which utilizes a wireless delivery system.

For example, one embodiment of the present invention is directed to an aircraft software and database upload system used with an aircraft having one or more software and/or database uploadable avionics units. The system includes a communications unit located in the aircraft in communication with one or more uploadable avionics units. The system also may include a wireless infrastructure to permit applications to operate over any existing or foreseeable air interface technologies. Those skilled in the art will appreciate that the wireless infrastructure according to one embodiment of the present invention may include any existing or foreseeable mobile telephony, paging, mobile satellite, and mobile radio systems without departing from the scope of the invention. Accordingly, the wireless infrastructure may include technologies such as cellular, Personal Communications Service (PCS), Global System for Mobile Communications (GSM), Code Division Multiple Access (CDMA), and higherspeed technologies known as General Packet Radio Services (GPRS) and $3^{rd}$ Generation Cellular, such as Enhanced Data rates for GSM Evolution (EDGE), Wide Band Code Division Multiple Access (WCDMA) and others. In one embodiment of the present invention, communication between the communications unit and the wireless infrastructure may be established upon receiving an event signal, such as a weight-on-wheels signal, among others, after the aircraft has landed, or when the aircraft is near landing or takeoff. The system further includes a software and database distribution and upload unit in communication with the cellular infrastructure.

Furthermore, one embodiment of the present invention provides an aircraft software distribution and upload system that requires little expense to implement because it utilizes well-known conventional wireless cellular technology and existing cellular infrastructure. One embodiment of the present invention also provides a system that can transmit the software and database upload files over multiple parallel communication channels to achieve the necessary transmission bandwidth and achieve a low data transmission time. The present invention also does not require a dedicated data link between the aircraft and the airline/aircraft operator engineering center and/or an airport terminal.

FIG. 1 illustrates an aircraft communication system 10 comprising a transmission/reception and avionics upload system in accordance with one embodiment of the present invention. An aircraft 12 containing an uploadable avionics unit is illustrated after landing. The aircraft 12 can receive data such as software and database upload files as wireless (e.g., cellular) communications signals from a wireless (e.g., cellular) infrastructure 14. Likewise, the aircraft 12 can transmit data associated with the aircraft 12 such as avionics measurement data, files, software, and database files as cellular communications signals via the cellular infrastructure 14. The cellular infrastructure 14 acts as a communications channel to the communications medium 16 for bi-directionally communicating information between the aircraft 12 and the medium 16. An airline/operations engineering center 18 is in communication with the medium 16 by way of any conventional communications medium such as, for example, a leased line. Once the cellular connections are made via the communications medium 16, data can flow bi-directionally between the aircraft 12 and the airline/operations engineering center 18.

Figure 2:
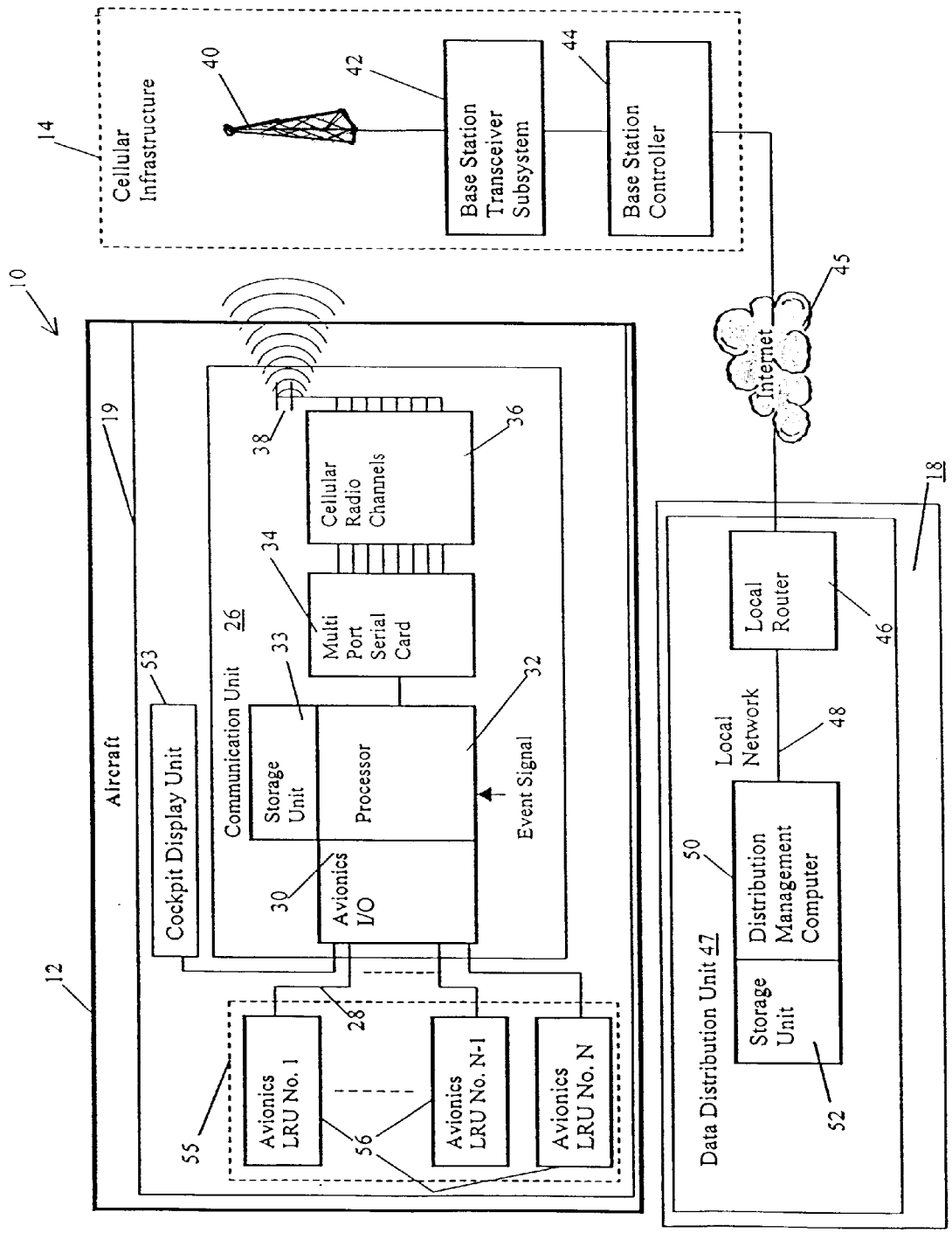
FIG. 2 is a block diagram illustrating a more detailed embodiment of the system illustrated in FIG. 1 according to an embodiment of the present invention.

FIG. 2 is a block diagram illustrating one embodiment of the communications system 10 illustrated in FIG. 1. The aircraft 12 includes a communications/storage unit 19 comprising one or more avionics systems 55 and a communications unit 26. The one or more avionics systems 55 may include, for example, a suite (1 through N) of avionics line replaceable units (LRU) 56. Each avionics LRU 56 includes storage media for storing operational software and/or database data in a digital format.

The software/database updates are transferred to the avionics LRU 56 from the communications unit 26 via a bus 28. The bus 28 is connected to an avionics I/0 interface 30 in the communications unit 26. The avionics I/O interface 30 can be a standard bus interface such as, for example, an ARINC 429 bus or Ethernet.

The avionics I/O interface 30 is connected to a processor 32 such as, for example, a Teledyne GroundLink® processor 32, and a storage unit 33. The processor 32 can be any general-purpose processor such as a personal computer, a microprocessor such as an Intel Pentium® processor, or a special purpose processor such as an application specific integrated circuit (ASIC) designed to operate in the communications system 10. The processor 32 is connected to one or more cellular channels 36 via a multi-port serial card 34.

Each I/O port of the serial card 34 is in communication with a cellular channel 36 which can open, sustain, and close a physical, over-the-air channel to the cellular infrastructure 14. The cellular channels 36 can transmit and receive simultaneously and thus can bi-directionally transmit and receive data in parallel from and to the aircraft 12. Each cellular channel 36 is connected to an antenna matching network. One or more antennas 38 are installed in the aircraft 12 in order to optimize free space radiation to the cellular infrastructure 14.

In one embodiment of the present invention, the processor 32 is responsive to an event signal, which may notify the processor 32 to initiate transmissions or receptions of digital data between the aircraft 12 and a remotely located computer at the airline/operators engineering center 18. The event signal may be associated with one or more aircraft parameters such as engine hydraulic system data from a pressure switch or sensor, brake pressure data from a pressure sensor, aircraft ground/air speed data, flight number/leg data, aircraft heading data from an Inertial Reference Unit (IRU) and/or Electronic Flight Instrument System (EFIS), weight-on-wheels or weight-off-wheels data from an air/ground relay, Greenwich Mean Time (GMT) or Universal Coordinated Time (UCT) from the captain's clock, and other similar event signals such as door open/closed sensors, and the like. The event signal also may be associated with an external signal received over the cellular network, such as via the Short Message Service (SMS). Upon receiving the event signal, the processor 32 prepares to make a connection with the computer remotely located from the aircraft 12 such as a computer located in the data distribution unit 47. The processor 32 can make the connection using one channel of the multi-port serial card 34 in communication with one or more cellular radio channels 36.

The connection request is transmitted over one cellular air link using the physical layer modulation of the cellular infrastructure 14, for example. The cellular infrastructure 14 includes one or more cells contained in the cellular infrastructure 14 comprising one or more antennas such as, for example, antenna 40, which is within free-space radiating range of the aircraft 12. The antenna 40 is connected to a cellular base station transceiver subsystem 42. The transceiver subsystem 42 is connected to a cellular base station controller 44. The cellular base station controller 44 makes a direct connection via a switch, such as a router (not shown), to a public or private network, such as the Internet 45, for example. In one embodiment of the present invention, the connection request is transmitted via the Internet 45 to the airline/operators engineering center 18.

A local router 46 in the data distribution unit 47 of the airline/operators engineering center 18 is connected to the Internet 45 via a connection to the backbone of the Internet 45, for example. The router 46 connects via a local area network 48 to the Internet 45. The local area network 48 can be any type of network such as, for example, a token ring network, ATM network, or Ethernet network, without departing from the scope of the present invention. A distribution management computer 50 is connected to the local area network 48 and is adapted for receiving a connection request from a specific aircraft tail number. The distribution management computer 50 searches a database in a storage unit 52 to determine if a new software/database update is available for the requesting aircraft 12. If a software/database update is available, the distribution management computer 50 sends an upload request to the communications unit 26 on the requesting aircraft 12 over the open communications channel via the cellular infrastructure 14, retrieves the appropriate file from the storage unit 52, and prepares the file for transmission to the requesting aircraft 12. The storage unit 52 can be any type of unit capable of storing data such as, for example, a magnetic, optic, or magneto-optic disk drive or array.

The processor 32 portion of the communications unit 26 receives the upload request and opens all available ports in the multi-port serial interface 34 and available cellular radio channels 36. Each I/O port of the serial interface 34 is connected to a cellular channel 36 which can open, sustain, and close a physical, over-the-air, channel to the cellular infrastructure 14. The cellular channels 36 can receive and transmit simultaneously and can thus receive (or transmit) data in parallel.

The software/database files can be transferred bi-directionally between the airline/operators engineering center 18 and the aircraft 12. In one embodiment of the present invention, the file can be transmitted via a public network such as the Internet 45 and all channels of the cellular infrastructure 14 that are opened by the processor 32 and received by the antenna 38. The serial interface 34 receives the data file from the cellular channels 36 and the processor 32 stores the data in the storage unit 33.

The data file is loaded by the processor 32 from the storage unit 33 to the avionics LRU 55 via the avionics I/O interface 30. The data file loading process may be initiated automatically by the processor 32 or may be initiated by a maintenance technician via a cockpit display 53, for example.

Data also may be transferred from the aircraft 12 to the airline/operators engineering center 18. Upon receiving an event signal generated by the aircraft 12, e.g., a weight-on-wheels signal from the landing gear among others, the processor 32 prepares the data for transmission and transmits the data to the multi-port serial interface 34. Each I/O port of the serial interface 34 is connected to a cellular radio channel 36 which can open, sustain, and close a physical, over-the-air channel to the cellular infrastructure 14. The cellular radio channels 36 can transmit simultaneously and thus can transmit data in parallel. The data provided for transmission can include any data associated with the aircraft 12 such as, for example, flight measurement and performance data.

Figure 3:
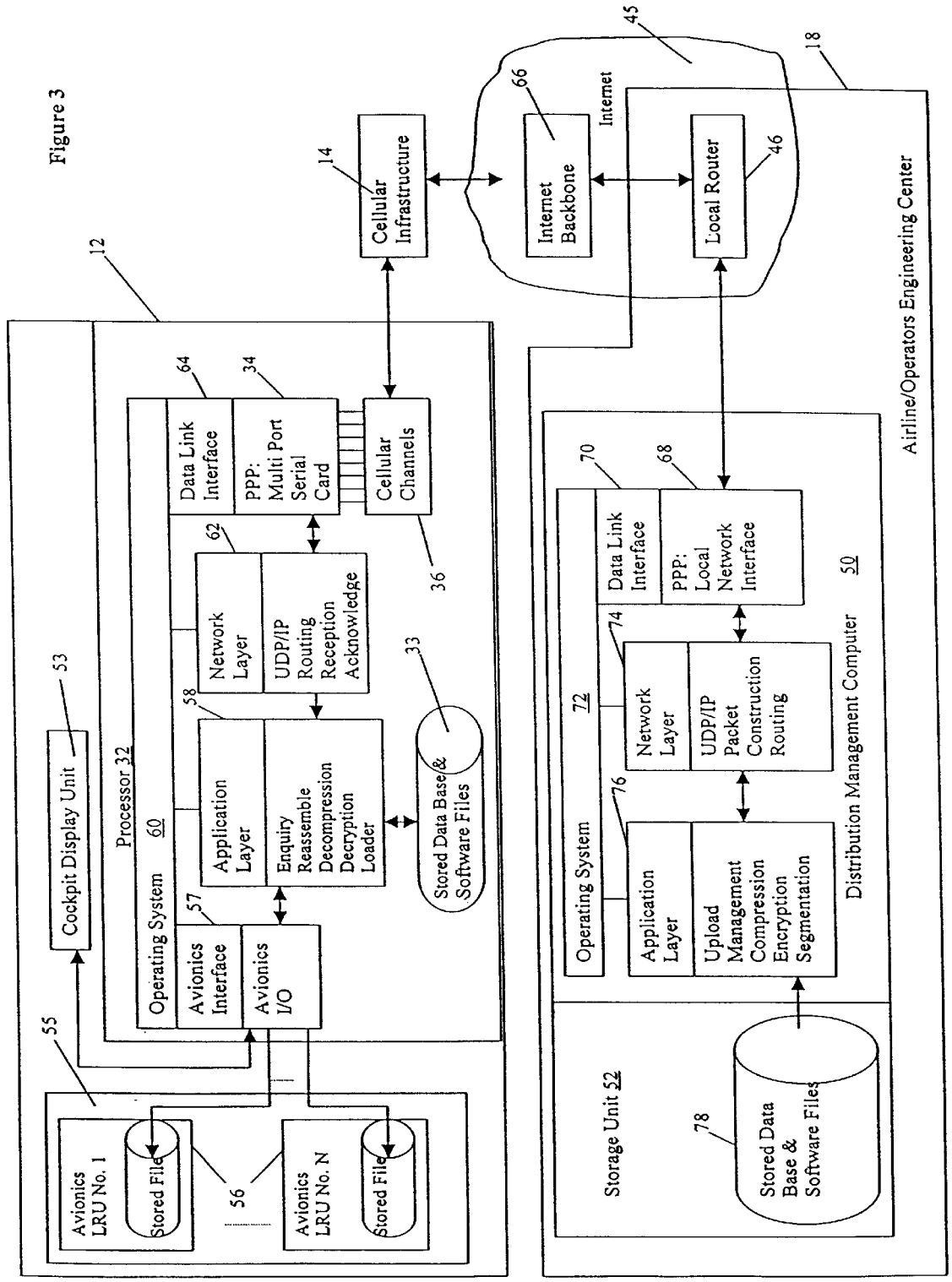
FIG. 3 is a block diagram illustrating data flow through the system illustrated in FIG. 2 according to an embodiment of the present invention.

FIG. 3 is a block diagram illustrating one embodiment of data flow through an avionics communications system such as, for example, the system 10 illustrated in FIG. 2. The avionics LRU database and software files 78 are stored in the storage unit 52. An application layer 76 of an operating system 72 of the distribution management computer 50 processes the file by compressing, encrypting, and segmenting the file, for example. In one embodiment of the present invention, if the data formatting is known and is structured in a particular form that lends itself to increased compression, the data may be processed prior to conventional compression to benefit from the data's storage structure and increase the overall compression ratio of the data. The operating system 72 can be any type of suitable operating system such as, for example, Windows 2000, UNIX, VMS, and any other real-time operating system, multi-user multi-tasking, single-user single tasking, or single-user multi-tasking operating system. A conventional stored file may be compressed from approximately 40 Mbytes to approximately 4 Mbytes. File compression may be achieved by any well-known conventional compression methods such as, for example, the methods embodied in the PKZIP® compression utility, manufactured by PKWARE, Inc., WINZIP®, STUFFIT®, and the like. Encryption can be accomplished using any suitable asymmetric (public key) or symmetric encryption method such as, for example, the method embodied in Data Encryption Software (DES), manufactured by American Software Engineering or the methods embodied in the RC2, RC4, or RC5 encryption software manufactured by RSA Data Security, Inc. During segmentation, individual datagrams of 1024 bytes, for example, are formed and indexed for subsequent reassembly. Those skilled in the art will appreciate that the scope of the invention is not limited in any way by one of the methods for processing, compressing, encrypting, or segmenting the data to be communicated between the aircraft 12 and the airline/operators engineering center 18 by way of a private or public network via the cellular infrastructure 14.

In one embodiment of the present invention, the operating system 72 passes the datagrams to a network layer 74, which constructs UDP/IP packets by adding message headers to the datagrams. The network layer 74 then routes the packets to one of the peer-to-peer protocol (PPP) threads running within the operating system 72 at a data link layer interface 70. The PPP conveys the packets via the local network interface 68 to the local router 46 for transmission to the backbone 66 of the Internet 45, for example. The data packets are routed via the cellular infrastructure 14. The network layer 74 receives acknowledgments of received packets from the processor 32 portion of the communications device 26 in the aircraft 12. The network layer 74 also re-queues packets that are dropped before reaching the processor 32.

The aircraft 12 receives the packets via the cellular radio channels 36 and routes them to the processor 32. The multi-port serial interface 34 receives the packets, and a data link layer interface 64 of an operating system 60 passes the packets to a network layer 62 of the operating system 60. The operating system 60 can be any type of suitable operating system such as, for example, UNIX, Windows 2000, VMS, and any other real-time operating system, multi-user multi-tasking, single-user single tasking, or single-user multi-tasking operating system. The network layer 62 sends acknowledgments of successfully delivered packets to the distribution management computer 50. The network layer 62 also removes the UDP/IP headers and passes the datagrams to an application layer 58. The application layer 58 processes the datagrams by reassembling, decrypting, decompressing, and if necessary post-processing, the datagrams to restore the file to its original form. After the file is restored to its original form prior to transmission, the application layer 58 passes the file to the storage unit 33. The functions performed by the aircraft 12 and the airline/operator engineering center 18 are similarly interchangeable when data are transferred from the aircraft 12 to the airline/operator engineering center 18. Those skilled in the art will appreciate that the scope of one embodiment of the present invention covers data communications between the aircraft 12 and the airline/operator engineering center 18 via a public or private network, such as the Internet 45 and the cellular infrastructure 14. Communication includes at least downloading data, files, programs, etc., from the aircraft 12, and uploading data, files, programs, etc., to the aircraft 12.

The file received by the aircraft 12 is uploaded by the application layer 58 to the target avionics LRU via the avionics interface 57. This upload may occur automatically upon the occurrence of an event or on command from the cockpit display unit 53 under maintenance technician control.

Figure 4:
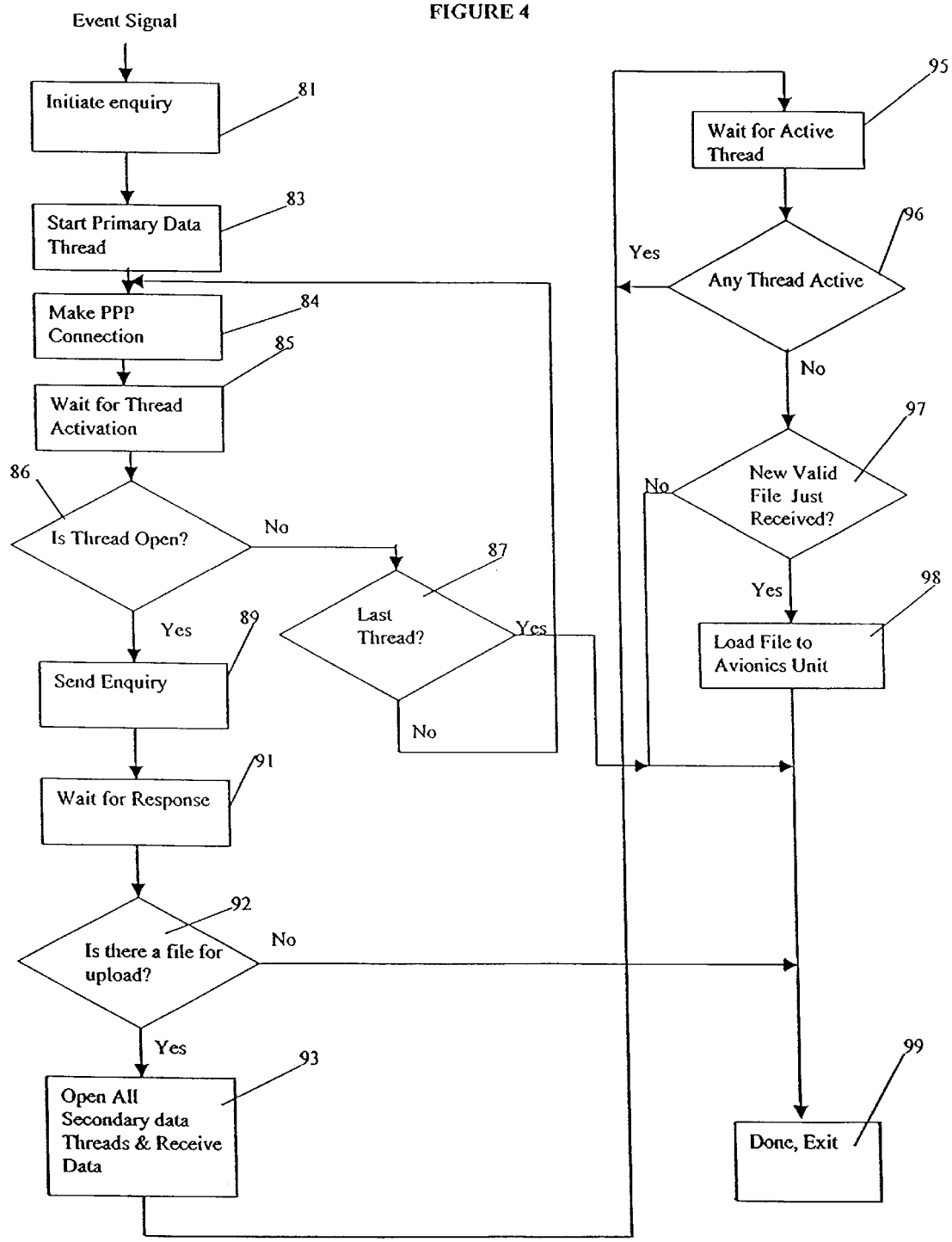
FIG. 4 is a flowchart illustrating a method carried out by the processor in the aircraft according to an embodiment of the present invention.

FIG. 4 is a flowchart illustrating one embodiment of a method carried out by the processor 32 in the aircraft 12 in accordance with one embodiment of the present invention. At step 81, the processor 32 receives an event signal generated or received by the aircraft 12 such as, for example, a weight-on-wheels signal, which indicates that the aircraft has landed, and the processor 32 initiates a connection request. Those skilled in the art will appreciate that any event signal generated by the aircraft 12 can be utilized to initiate a connection request such as engine hydraulic system data from a pressure switch or sensor, brake pressure data from a pressure sensor, aircraft ground speed data, flight number/leg data, aircraft heading data from an Inertial Reference Unit (IRU) and/or Electronic Flight Instrument System (EFIS), weight-on-wheels or weight-off-wheels data from an air/ground relay, Greenwich Mean Time (GMT) or Universal Coordinated Time (UCT) from the captain's clock, and other similar event signals such as door open/closed sensor, and the like. The event signal also may be associated with an external signal received over the cellular network, such as via the Short Message Service (SMS). Accordingly, although the description of the present invention refers primarily to a weight-on-wheels signal, the scope of the invention is not limited thereto. Any event causing a signal to be generated by the aircraft, received by the aircraft 12 or otherwise, can be utilized by the processor 32 to initiate a connection request.

At step 83, the primary data thread is started to initiate a call for the connection request transmittal and open a communications channel to the airline/operator engineering center 18. At step 84 the PPP connection is initiated for a primary data thread via one of the cellular radio channels 36. At step 85, a wait state is invoked for a predetermined period, and at decision block 86 the processor 32 determines if the communications channel was successfully opened. If no open operational thread is found at decision block 86 and the thread was not the last one available at decision block 87, the process loops back to step 84 and tries the next available thread. If no more threads are available at decision block 87, the process exits at step 99. If a thread is open at decision block 86, a connection request packet is sent by the application layer 58 to the distribution management computer 50. The application layer 58 waits for a response at step 91. If the response at decision block 92 indicates that the airline/operator engineering center 18 does not contain a file for uploading then the method is complete and the thread is closed at step 99.

At decision block 92, if the response indicates that a file is available for uploading from the distribution management computer 50, then all available secondary data threads are opened by the processor 32 and the data are received at step 93 by the application layer 58.

A wait state is invoked at step 95 for a predetermined period and at decision block 96 the processor 32 determines if there are any active threads, i.e., if there are any packets that have not been received or have been received with an error. If there are packets remaining, the process enters the wait state at step 95 and subsequently determines at decision block 96 if there are any active threads. If, at decision block 96 there are no active threads (no packets remaining to be received), at decision block 97, the processor 32 determines whether the received file is valid. If the file is not valid the method is completed and exits at step 99. If at decision block 97 the processor 32 detects a valid file, the file is loaded (or made available for manual loading via the cockpit display unit 53) to the specific avionics LRU 56, and the method completes and exits at step 99.

Figure 5:
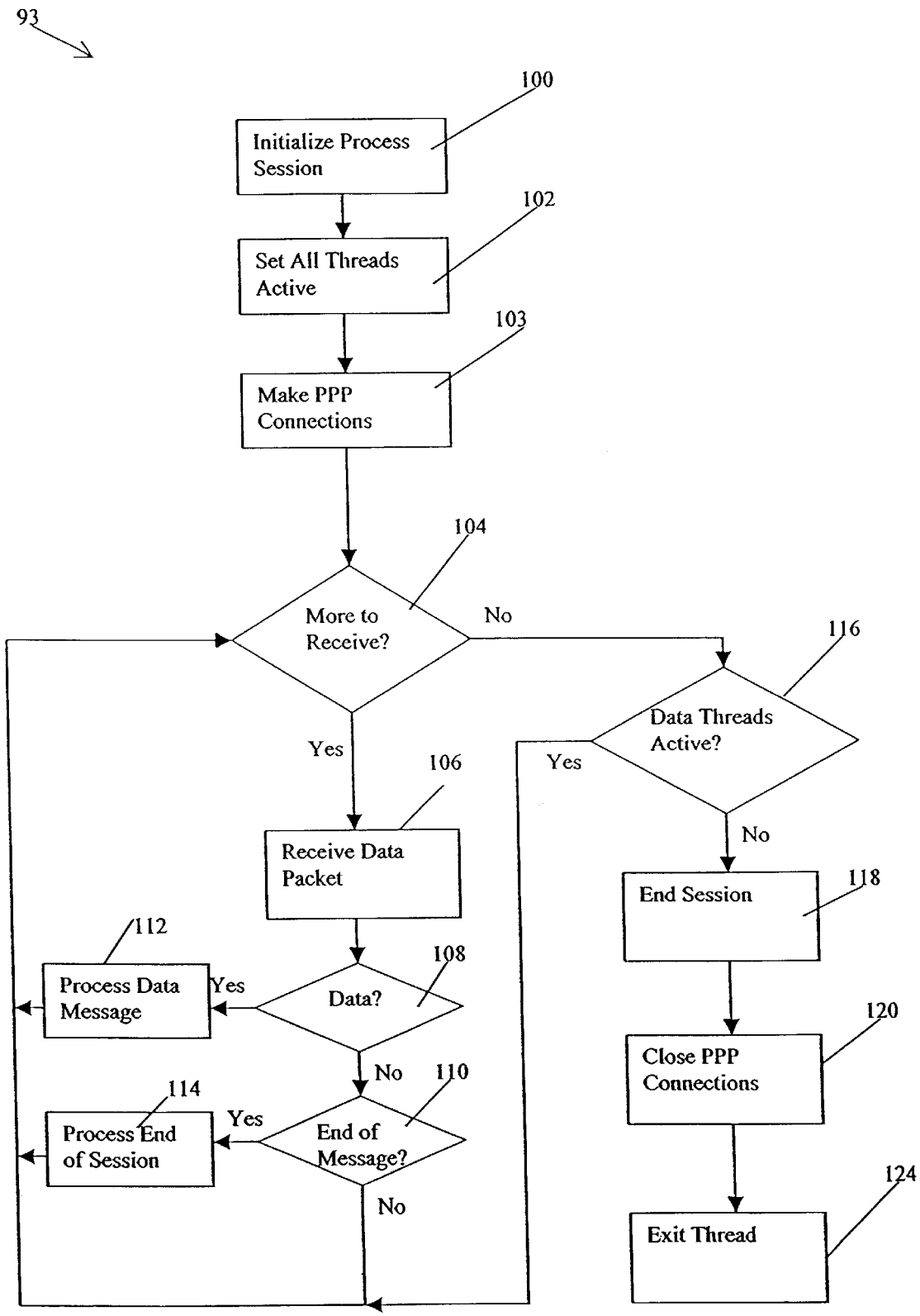
FIG. 5 is a flowchart illustrating a method of performing the start secondary data threads and receiving data step of FIG. 4 according to an embodiment of the present invention.

FIG. 5 is a flowchart illustrating a method of performing the open secondary data thread, step 93, in FIG. 4 in accordance with one embodiment of the present invention. The secondary data thread transmissions begins at step 100. At step 102, the secondary data threads are started in order to open all available communications channels to the airline/operator engineering center 18. At step 103, the PPP connections are initiated for each secondary data thread via the cellular radio channels 36. At decision block 104, it is determined if there are any more packets to be received. If there are, the next packet in the data thread is received at step 106. If no packets are left to be received in the data threads, as determined at decision block 104, at decision block 116 the process determines if any of the data threads are active. If a data thread is active, the process returns to decision block 104 and repeats decision block 116 until there are no remaining threads. If there are no active threads, at decision block 116, the upload session is ended at step 118 and the PPP connections for all the data threads are closed at step 120. The process then exits at step 124.

If at decision block 104 it is determined that more packets are to be received, then the remaining packets are received at step 106. If the packet is a data packet, as determined at decision block 108, then the data message contained within the data packet is processed at step 112 and the process loops back to decision block 104 to receive more data.

If, at decision block 108, the packet is not a data packet, then, at decision block 110, the process determines if the packet is an end of session message. If the packet is an end of session message it is processed at step 114 and the process returns to decision block 104. Otherwise, the process returns from decision block 110 to step 104.

Figure 6:
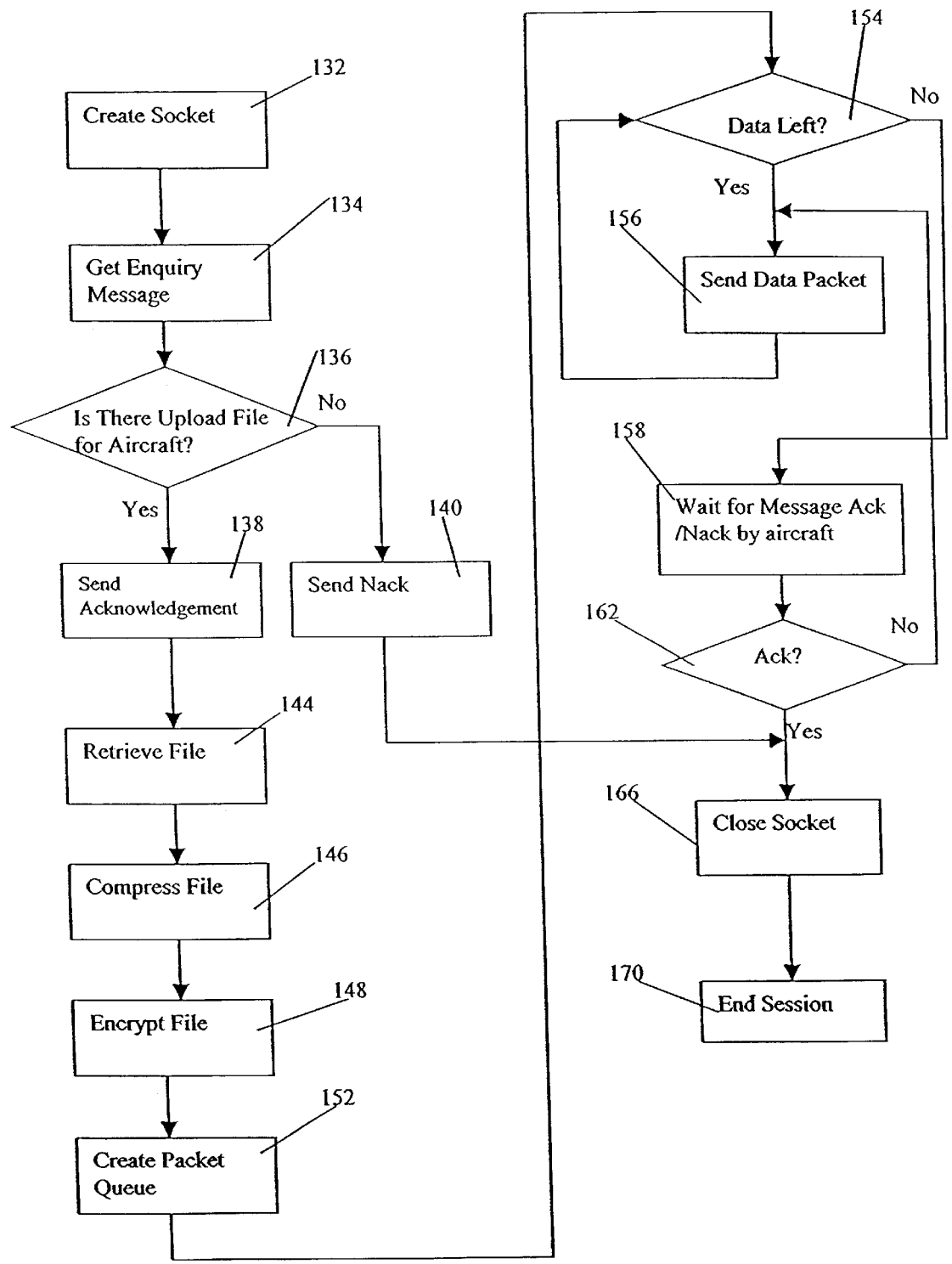
FIG. 6 is a flowchart illustrating a method of operating the distribution management computer in the airlines/operators engineering center according to an embodiment of the present invention.

FIG. 6 is a flowchart illustrating one embodiment of a method of operating the distribution management computer 50 in the airline/operators engineering center 18 in accordance with one embodiment of the present invention. In response to a call placed by the processor 32 via a primary channel, a socket is opened at step 132 to allow the operating system 72 in the distribution management computer 50 to receive messages transported across a network, such as the Internet 45, for example. At step 132, if the network is the Internet 45, the processor 50 waits for a connection message from the application layer 58 of the processor 32, via the Internet 45. When a connection message is received at step 134, at decision block 136 the distribution management computer 50 determines whether there are one or more upload files available for the requesting aircraft 12. If there are no upload files available, the application layer 76 does not respond with an upload request message over the Internet 45 to the aircraft 12 and the operating system 72 closes the socket at 166. If there are one or more upload files available for the specific aircraft 12, then at step 138 an upload request is sent in the acknowledgment for the connection message to the aircraft 12 by the application layer 76. At step 144, the file 78 to be uploaded is retrieved from the storage unit 52 by the operating system 72. The application layer 76 compresses the file to be uploaded at step 146 and encrypts the data at step 148. At step 152, the data are segmented into datagrams and UDP/IP packets are constructed. The packets are then placed in a packet queue by the network layer 74. At step 156, the packets are transmitted by the data link interface 70 via the local network interface 68 over the Internet 45, and via the cellular infrastructure 14 to the cellular radio channels 36 of the communications unit 26. The packets are transmitted over a number of threads corresponding to the number of cellular radio channels 36 that were opened by the processor 32.

When there are no more data packets to be sent, as determined at decision block 154, the network layer 74 waits for an acknowledgement message from the processor 32. If a negative acknowledgement is returned and detected at decision block 162, the process loops back to step 156 in order to resend the packet. An acknowledgement is received at decision block 162, and at step 166 the socket is closed and the operating system 72 ends the session at step 170.

Figure 7:
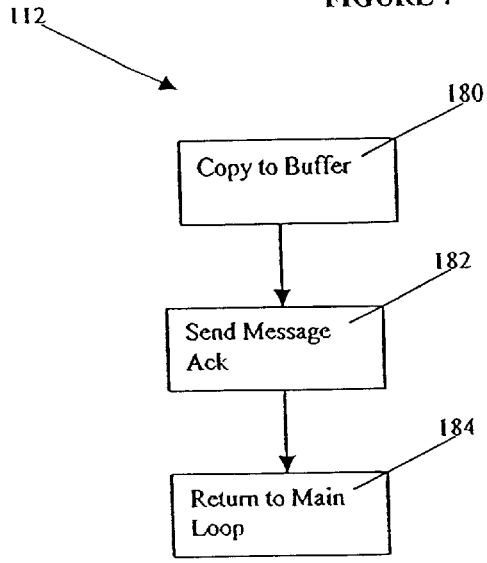
FIG. 7 is a flowchart illustrating a method of performing the process data message step of FIG. 5 according to an embodiment of the present invention.

FIG. 7 is a flowchart illustrating one embodiment of a method of performing the data message process step 112 of FIG. 5 in accordance with one embodiment of the present invention. At step 180, the received data message is copied to a buffer and at step 182 an acknowledgment of the data received is sent. At step 184, the process returns to step 112 of FIG. 7.

Figure 8:
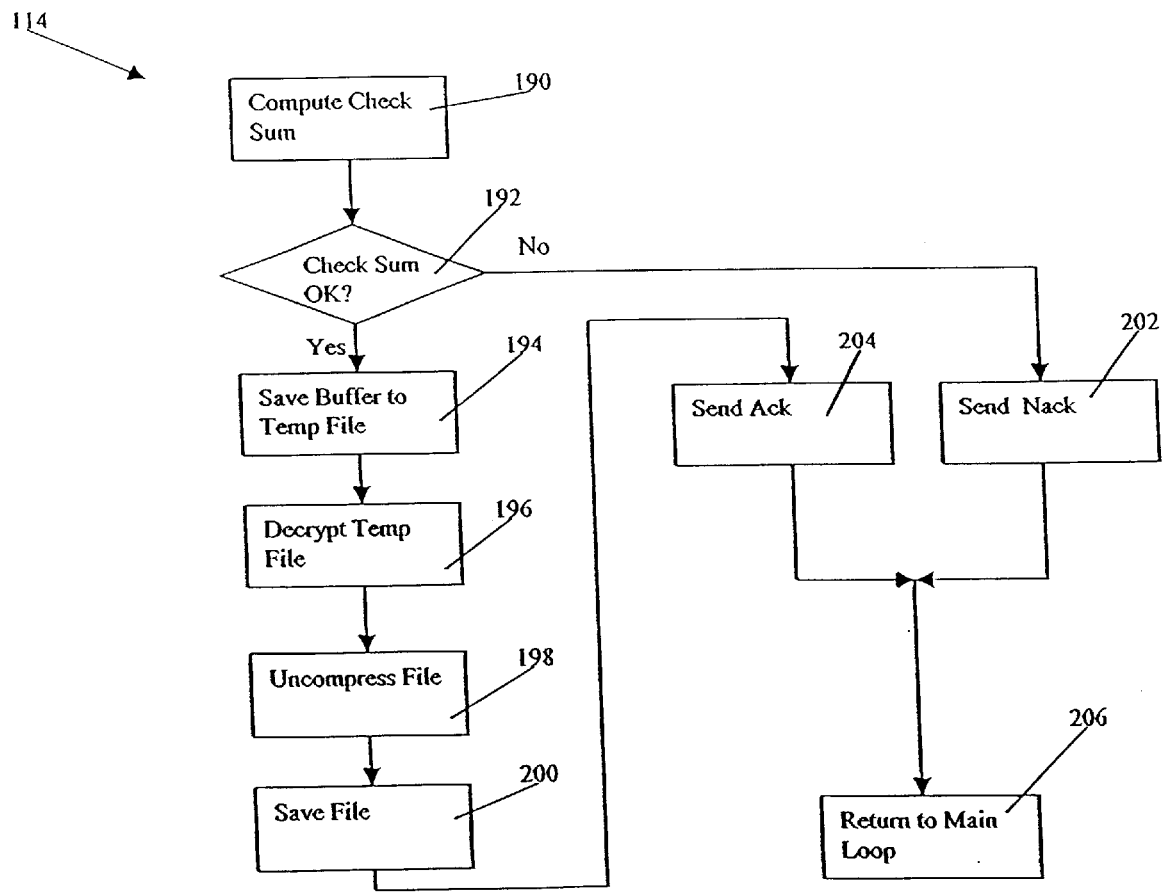
FIG. 8 is a flowchart illustrating a method of performing the process end of session step of FIG. 5; and according to an embodiment of the present invention.

FIG. 8 is a flowchart illustrating the steps included in the end session process step 114 of FIG. 5 in accordance with one embodiment of the present invention. At step 190, the checksum is computed for the received data to check the integrity of the data. The checksum is checked at decision block 192 and, if it is correct, the processor 32 saves the buffer to a temporary file at step 194. The processor 32 decrypts the file at step 196 and decompresses the file at step

198. The decompressed file is stored at step 200 by the processor 32 in the storage unit 33. At step 204 the processor 32 sends an end of session acknowledgement (ACK) message to the distribution management computer 50 and at step 206 the process returns to step 114 of FIG. 5. If the checksum is not correct, as determined at decision block 192, the processor 32 sends an unsuccessful end of session negative acknowledgement (NACK) message at step 202. The negative acknowledgement notifies the distribution management computer 50 to re-send the data and the process returns to step 114 of FIG. 5.

Figure 9:
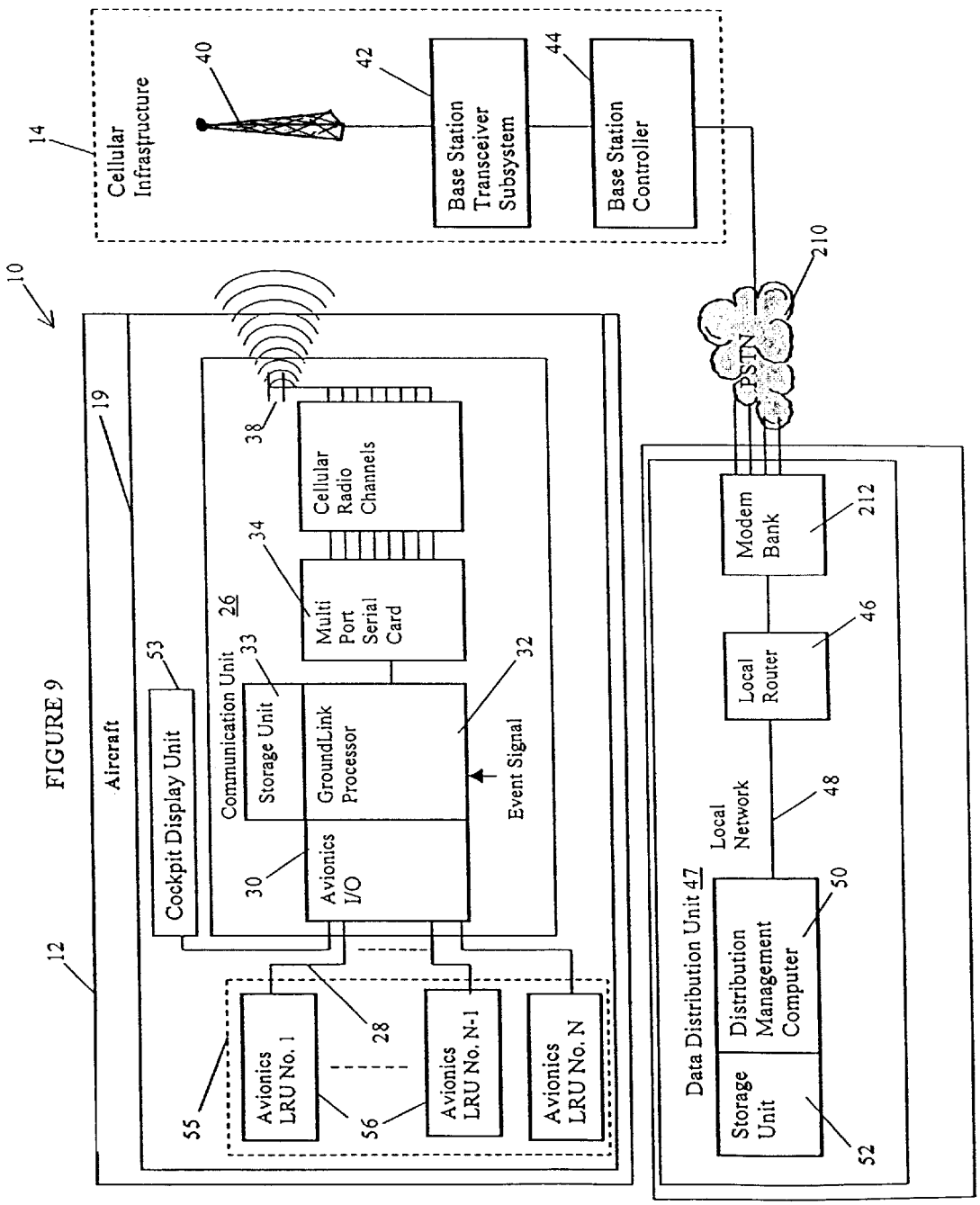
FIG. 9 is a block diagram illustrating another embodiment of the system illustrated in FIG. 1.

FIG. 9 is a block diagram illustrating the communication system 10 of in FIG. 1 in accordance with one embodiment of the present invention. The operation of the system 10 of FIG. 9 is similar to that described in conjunction with the system 10 of FIG. 2. However, the data are transmitted from the distribution management computer 50 via a public-switched telephone network (PSTN) 210. A modem bank 212 receives the data from the local router 46 and sends them via the PSTN 210 to the cellular infrastructure 14. The modem bank 212 can have a modem dedicated for transmitting data to each one of the cellular channels 36.

While the present invention has been described in conjunction with its presently contemplated best mode, it is clear that it is susceptible to various modifications, modes of operation, and embodiments, all within the ability of those skilled in the art and without exercise of further inventive activity. Further, while the present invention has been described in connection with what is presently considered the most practical and preferred embodiments, it is to be understood that the invention is not limited to the disclosed embodiments, but on the contrary, it is intended to cover various modifications and equivalent arrangements included within the scope of the appended claims. For example, although the system has been described hereinabove as transferring data from an aircraft, the system also can be used to transfer data to an aircraft with no modifications in the system. Also, the system may be used to transmit data while an aircraft is in flight. Furthermore, the system may be used without encryption and without data compression prior to sending data. The foregoing description and the following claims are intended to cover all such modifications and variations.

What is claimed is:

1. An aircraft data communications system, comprising:
   a communications device located in an aircraft;
   an avionics information storage device located in the aircraft and in communication with the communications device and a cellular infrastructure, wherein the storage device contains data associated with the aircraft stored therein: and
   a computer remotely located from the aircraft and in communication with the cellular infrastructure;
   wherein, at least one of the communications device and the computer is used for establishing a bi-directional communications channel via the cellular infrastructure between the communications device and the computer and initiating a data exchange therebetween.

2. The system of claim 1, wherein the communications device comprises a processor for processing information associated with the aircraft to be communicated to and from the cellular infrastructure.

3. The system of claim 2, wherein the processor is in communication with a cellular radio channel.

4. The system of claim 2, wherein the processor is in communication with a plurality of cellular radio channels.

5. The system of claim 2, wherein the processor is communications with a first storage device.

6. The system of claim 1, wherein the communications device automatically establishes the bi-directional communications channel upon receiving an event signal.

7. The system of claim 6, wherein the event signal is any one, or combination of a weight-on-wheels signal, a weight-off-wheels signal, hydraulic system signal, a brake system signal, a door open signal, a door closed signal, an aircraft ground speed signal, an aircraft air speed signal, a flight information signal, an aircraft heading signal, a time, and an external signal received over the cellular infrastructure.

8. The system of claim 7, wherein the external signal is a Short Message Service (SMS) signal.

9. The system of claim 1, further comprising a cockpit display device in communication with the communications device.

10. The system of claim 9, wherein the bi-directional communications channel is established via the cockpit device.

11. The system of claim 1, wherein the avionics information storage device comprises a line replaceable unit.

12. The system of claim 11, wherein the line replaceable unit comprises a storage medium.

13. The system of claim 12, wherein the storage medium comprises avionics unit software.

14. The system of claim 12, wherein the storage medium comprises an avionics navigation database.

15. The system of claim 1, wherein the computer further comprises a second storage device in communication therewith.

16. The system of claim 1, wherein the computer is in communications with a router.

17. The system of claim 16, wherein the computer is in communication with the cellular infrastructure via a network.

18. The system of claim 17, wherein the network is the Internet.

19. The system of claim 1, wherein the computer is in communication with a modem.

20. The system of claim 19, wherein the computer is in communication with the cellular infrastructure via the public switched telephone network.

21. The system of claim 1, wherein the cellular infrastructure comprises:
   an antenna;
   a base station transceiver in communication with the antenna; and
   a base station controller in communication with the transceiver.

22. An aircraft data management system, comprising:
   a communications device located in an aircraft and in communication with a cellular infrastructure for establishing a bi-directional communications channel via the cellular infrastructure between the communications device and a remotely located computer; and
   an avionics information storage device located in the aircraft and in communication with the communications device, the avionics information storage device including a line replaceable unit, wherein the storage device contains data associated with the aircraft stored therein;
   wherein the communications device is used for receiving avionics information from the remotely located computer and transmitting data associated with the aircraft to the remotely located computer.

23. The system of claim 22, wherein the line replaceable unit comprises a storage medium for storing avionics information received from the remotely located computer.

24. The system of claim 23, wherein the avionics information comprises avionics unit software that is received by the communications device from the remotely located computer and is stored in the storage medium.

25. The system of claim 23, wherein the avionics information comprises an avionics navigation database that is received by the communications device from the remotely located computer and is stored in the storage media.

26. The system of claim 22, wherein the communications device comprises a processor for processing information associated with the aircraft to be communicated to and from the cellular infrastructure.

27. The system of claim 26, wherein the processor is in communication with a cellular radio channel.

28. The system of claim 26, wherein the processor is in communication with a plurality of cellular channels.

29. The system of claim 26, wherein the processor is in communication with a storage device.

30. The system of claim 22, wherein the communications device automatically establishes the bi-directional communications channel upon receiving an event signal.

31. The system of claim 30, wherein the event signal is any one, or combination of a weight-on-wheels signal, a weight-off-wheels signal, hydraulic system signal, a brake system signal, a door open signal, a door closed signal, an aircraft ground speed signal, an aircraft air speed signal, a flight information signal, an aircraft heading signal, a time, and an external signal received over the cellular infrastructure.

32. The system of claim 31, wherein the external signal is a Short Message Service (SMS) signal.

33. The system of claim 22, further comprising a cockpit display device in communication with the communications device.

34. The system of claim 33, wherein the bi-directional communications channel is established via the cockpit device.

35. The system of claim 22, wherein the cellular infrastructure comprises:
an antenna;
a base station transceiver in communication with the antenna; and
a base station controller in communication with the transceiver.

36. An aircraft data management system, comprising:
a communications device located remotely from an aircraft and in communication with a cellular infrastructure for establishing a bi-directional communications channel via the cellular infrastructure between the communications device and the remote aircraft; and
a computer in communication with the communications device;
wherein the communications device is used for transmitting avionics information from the computer to the remote aircraft and receiving data associated with the aircraft from the remote aircraft;
wherein the avionics information is stored in an avionics information storage device located on the aircraft; and
wherein the storage device contains data associated with the aircraft stored therein.

37. The system of claim 36, wherein the computer further comprises a second storage device in communication therewith, the storage device containing avionics information associated with the aircraft.

38. The system of claim 36, wherein the communications device is a router.

39. The system of claim 38, wherein the computer is in communication with the cellular infrastructure via a network.

40. The system of claim 39, wherein the network is the Internet.

41. The system of claim 36, wherein the communications device is a modem.

42. The system of claim 41, wherein the computer is in communication with the cellular infrastructure via the public switched telephone network.

43. The system of claim 36, wherein the cellular infrastructure comprises:
an antenna;
a base station transceiver in communication with the antenna; and
a base station controller in communication with the transceiver.

44. An aircraft, comprising:
a communications device; and
an avionics information storage device in communication with the communications device, wherein the storage device contains data associated with the aircraft stored therein;
wherein, the communications device is used for establishing a bi-directional communications channel via a cellular infrastructure between the communications device and a computer remotely located from the aircraft and initiating a data exchange therebetween; and
wherein the communications device is used for receiving avionics information from the remotely located computer and transmitting data associated with the aircraft to the remotely located computer.

45. The aircraft of claim 44, further comprising an avionics information storage device in communication with the communications device, the avionics information storage device including a line replaceable unit for storing the avionics information received from the remotely located computer.

46. The aircraft of claim 45, wherein the line replaceable unit comprises a storage medium for storing the avionics information received from the remotely located computer.

47. The aircraft of claim 46, wherein the avionics information comprises avionics unit software.

48. The aircraft of claim 46, wherein the avionics information comprises an avionics navigation database.

49. The aircraft of claim 45, wherein the communications device comprises a processor for processing information associated with the aircraft to be communicated to and from the cellular infrastructure.

50. The aircraft of claim 49, wherein the processor is in communication with a cellular radio channel.

51. The aircraft of claim 49, wherein the processor is in communication with a plurality of cellular channels.

52. The aircraft of claim 44, wherein the communications device automatically establishes the bi-directional communications channel upon receiving an event signal.

53. The aircraft of claim 52, wherein the event signal is any one, or combination of a weight-on-wheels signal, a weight-off-wheels signal, hydraulic system signal, a brake system signal, a door open signal, a door closed signal, an aircraft ground speed signal, an aircraft air speed signal, a flight information signal, an aircraft heading signal, a time, and an external signal received over the cellular infrastructure.

54. The aircraft of claim 53, wherein the external signal is a Short Message Service (SMS) signal.

55. The aircraft of claim 44, further comprising a cockpit display device in communication with the communications device.

56. The aircraft of claim 55, wherein the bi-directional communications channel is established via the cockpit device.

57. The system of claim 44, wherein the cellular infrastructure comprises:
an antenna;
a base station transceiver in communication with the antenna; and
a base station controller in communication with the transceiver.

58. A network, comprising:
a cellular infrastructure for bi-directionally communicating information associated with an aircraft between a communications device located on the aircraft and a computer located remotely from the aircraft;
wherein the information associated with the aircraft is stored in an avionics information storage device located in the aircraft: and
wherein the communications device and the computer are configured for communicating via the cellular infrastructure.

59. The network of claim 58, wherein the cellular infrastructure communicates with the communications device via a plurality of cellular channels.

60. The network of claim 58, wherein the cellular infrastructure communicates with the computer via a public network.

61. The network of claim 60, wherein the public network is the Internet.

62. The network of claim 60, wherein the public network is the public switched telephone network.

63. The network of claim 58, wherein the cellular infrastructure comprises:
an antenna;
a base station transceiver in communication with the antenna; and
a base station controller in communication with the transceiver.

64. An aircraft data communications system, comprising:
means for communicating information located in an aircraft;
means for storing avionics information associated with the aircraft in communication with the means for communicating and in communication with a cellular infrastructure, wherein the means for storing contains data associated with the aircraft stored therein; and
means for processing remotely located from the aircraft in communication with the cellular infrastructure;
wherein, at least one of the means for communicating and the means for processing is used for establishing a bi-directional communications channel via the cellular infrastructure between the means for communicating and the means for processing and is used for initiating a data exchange therebetween.

65. An aircraft data management system, comprising:
means for communicating located in an aircraft for establishing a bi-directional communications channel via a cellular infrastructure between the means for communicating and a remotely located means for processing, wherein the cellular infrastructure is in communication with the means for communicating; and means for storing avionics information associated with the aircraft in communication with the means for communicating, the means for storing including a line replaceable device;
wherein the means for storing avionics information contains data associated with the aircraft stored therein.

66. An aircraft data management system, comprising:
means for communications located remotely from an aircraft in communication with a cellular infrastructure for establishing a bi-directional communications channel via the cellular infrastructure between the communications device and the remote aircraft; and
means for processing avionics information associated with an aircraft in communication with the communications device;
wherein the means for communicating transmits avionics information from the means for processing to the remote aircraft and receives data associated with the aircraft from the remote aircraft;
wherein the avionics information is stored in an avionics information storage device located on the aircraft; and
wherein the storage device contains data associated with the aircraft stored therein.

67. An aircraft, comprising:
means for communicating;
means for storing avionics information associated with the aircraft in communication with the means for communicating and in communication with a cellular infrastructure, wherein the means for storing contains data associated with the aircraft stored therein; and
wherein, the means for communicating is used for establishing a bi-directional communications channel via the cellular infrastructure between the means for communicating and a means for processing remotely located from the aircraft and is used for initiating a data exchange therebetween.

68. A method of updating digital files in an aircraft, comprising:
transmitting a request for a file from an aircraft to a remotely located computer via a cellular infrastructure;
receiving the file transmitted by the remotely located computer via the cellular infrastructure in the form of a plurality of packets;
storing the file in an avionics information storage device located in the aircraft, wherein the storage device contains data associated with the aircraft stored therein; and
processing the plurality of packets to restore the file transmitted by the remotely located computer.

69. The method of claim 68, further comprising storing the requested file in an avionics information storage device located in the aircraft.

70. The method of claim 68, wherein transmitting a request for a file comprises transmitting a request for an avionics unit software upload.

71. The method of claim 68, wherein transmitting a request for a file comprises transmitting a request for an avionics navigation database upload.

72. The method of claim 68, further comprising receiving an event signal by the aircraft prior to transmitting a request for a file.

73. The method of claim 72, wherein receiving an event signal comprises receiving an event signal from a group consisting of a combination of one or more of a weight-on-wheels signal, a weight-off-wheels signal, a hydraulic system signal, a brake system signal, an aircraft ground speed signal, an aircraft air speed signal, a flight information signal, an aircraft heading signal, a time signal, a door open signal, a door closed signal, a cockpit display signal, and an external signal received over the cellular infrastructure.

74. The method of claim 73, wherein the external signal is a Short Message Service (SMS) signal.

75. The method of claim 68, wherein receiving the file from the remotely located computer via the cellular infrastructure comprises receiving the plurality of packets over a plurality of cellular radio channels on the aircraft.

76. The method of claim 68, wherein receiving the plurality of packets comprises receiving the plurality of packets at a multi port serial interface.

77. The method of claim 68, wherein receiving the plurality of packets comprises routing the plurality of packets to a processor.

78. The method of claim 68, wherein processing the plurality of packets further comprises reassembling the packets.

79. The method of claim 68, wherein processing the plurality of packets comprises decompressing the received packets.

80. The method of claim 68, wherein processing the plurality of packets comprises decrypting the received packets.

81. The method of claim 68, further comprising loading the received file in a storage device.

82. The method of claim 81, wherein loading the received file comprises loading the received file in an avionics information storage device.

83. A method of updating digital files in an aircraft, comprising:
  receiving a request for a file from an aircraft at a remotely located computer via a cellular infrastructure;
  processing the requested file into a plurality of packets;
  transmitting the plurality of packets by the remotely located computer to the requesting aircraft via the cellular infrastructure; and
  storing the plurality of packets in an avionics information storage device located in the aircraft, wherein the storage device contains data associated with the aircraft stored therein.

84. The method of claim 83, wherein processing the file comprises uploading the file from a storage device.

85. The method of claim 83, wherein processing the file comprises compressing the file.

86. The method of claim 83, wherein processing the file comprises encrypting the file.

87. The method of claim 83, wherein processing the file comprises segmenting the file into a plurality of datagrams.

88. The method of claim 87, further comprising constructing UDP/IP packets from the datagrams.

89. The method of claim 88, further comprising routing the packets to a PPP thread.

90. The method of claim 89, further comprising conveying the packets via the PPP thread from a local network interface to a local router.

91. The method of claim 90, further comprising transmitting the packets from the local router to the Internet.

92. The method of claim 83, further comprising receiving acknowledgements of received packets from the aircraft.

93. The method of claim 83, further comprising:
  re-queuing dropped packets that are not received by the aircraft; and
  re-transmitting the re-queued packets to the aircraft.

94. A method of receiving a file in an aircraft, comprising:
  receiving an event signal by an aircraft;
  initiating a connection request with a computer remotely located from the aircraft for uploading a file;
  starting an initial primary data thread for making an initial call for a connection request to the remotely located computer;
  initiating a PPP connection for the primary data thread via at least one of a plurality of cellular channels;
  determining if a cellular channel was successfully opened;
    if a cellular channel was successfully opened:
      sending a connection request packet to the remotely located computer;
      determining whether the remotely located computer contains the requested file;
        if the remotely located computer contains the requested file:
        opening secondary data threads;
        receiving the file from the remotely located computer in the form of packets;
        determining whether any packets have not been received;
      loading the file to an avionics information storage device; and
    if the cellular channel was not successfully opened:
    initiating a PPP connection for a subsequent data thread.

95. The method of claim 94, wherein opening the secondary data threads further comprises:
  initializing a process session;
  activating the secondary threads to open available cellular communications channels to the remotely located computer;
  initiating PPP connections for the secondary data threads;
  determining whether there remain additional packets to be received;
    if there are additional packets to be received:
    receiving the additional data packets;
    determining whether a received packet is a data packet;
      if the received packet is a data packet:
      processing the data packet;
      receiving additional packets;
    if there are no additional packets to be received:
    determining whether the packet is an end of session message;
      if the packet is an end of session message:
      processing the end of session message;
    determining if any remaining data threads are active;
      if there are active data threads remaining:
      receiving additional packets;
      if there are no active data threads remaining:
      ending the process session; and
      closing the PPP connections for the remaining threads.

96. The method of claim 95, wherein processing the data packet comprises:
  copying the received data packet to a buffer; and
  sending an acknowledgement that the data packet has been received.

97. The method of claim 95, wherein processing the end of session message comprises:
  computing a check sum of the received data packets;
    if the checksum is valid:
    saving a buffer containing the received packets to a temporary file;
    decrypting the temporary file;

decompressing the temporary file;

saving the file to a storage device; and sending an acknowledgment to the remotely located computer.

98. The method of claim 97, wherein if the checksum is not valid:

sending a negative acknowledgment to the remotely located computer.

99. A method of transmitting a file to an aircraft, comprising:

creating a socket upon receiving a request for a file;

receiving a connection message from a network;

determining whether there is a file available for uploading to an aircraft based on the request;

if a file is available for uploading:

sending an upload request message to the aircraft;

sending an acknowledgement for the request to the aircraft;

retrieving the file to be uploaded to the aircraft from a storage device;

processing the file;

transmitting the packets via the cellular infrastructure over the network to the aircraft; and storing the packets in an avionics information storage device locate din the aircraft, wherein the storage device contains data associated with the aircraft stored therein;

when no packets remain to be sent, receiving an acknowledgement message from the aircraft; and closing the socket.

100. The method of claim 99, wherein processing the file comprises:

compressing the file;

encrypting the file; and segmenting the file into datagrams and UDP/IP packets and placing the packets in a packet queue.

101. The method of claim 99, wherein receiving a connection message from a network comprises receiving a connection message from the Internet.

102. The method of claim 99, wherein transmitting the packets via the cellular infrastructure over the network to the aircraft comprises transmitting the packets via the cellular infrastructure over the Internet to the aircraft.

103. The method of claim 99, wherein receiving a connection message from a network comprises receiving a connection message from the PSTN.

104. The method of claim 99, wherein transmitting the packets via the cellular infrastructure over the network to the aircraft comprises transmitting the packets via the cellular infrastructure over the PSTN to the aircraft.

* * * * *

UNITED STATES PATENT AND TRADEMARK OFFICE
CERTIFICATE OF CORRECTION

PATENT NO. : 6,816,728 B2
DATED : November 9, 2004
INVENTOR(S) : Tamas M. Igloi and Ghobad Karimi It is certified that error appears in the above-identified patent and that said Letters Patent is hereby corrected as shown below:

Column 5,
Line 30, delete "I/0" and subtitute therefor -- I/O --.

Column 11,
Line 13, delete "of in" and substitute therefor -- of --.
Line 51, delete "therein:" and substitute therefor -- therein; --.

Column 12,
Lines 1-2, delete "is communications" and substitute therefor -- is in communication --.

Column 19,
Line 26, delete "locate din" and substitute therefor -- located in --.

Signed and Sealed this

Twenty-sixth Day of July, 2005

JON W. DUDAS
*Director of the United States Patent and Trademark Office*